UNITED STATES PATENT OFFICE.

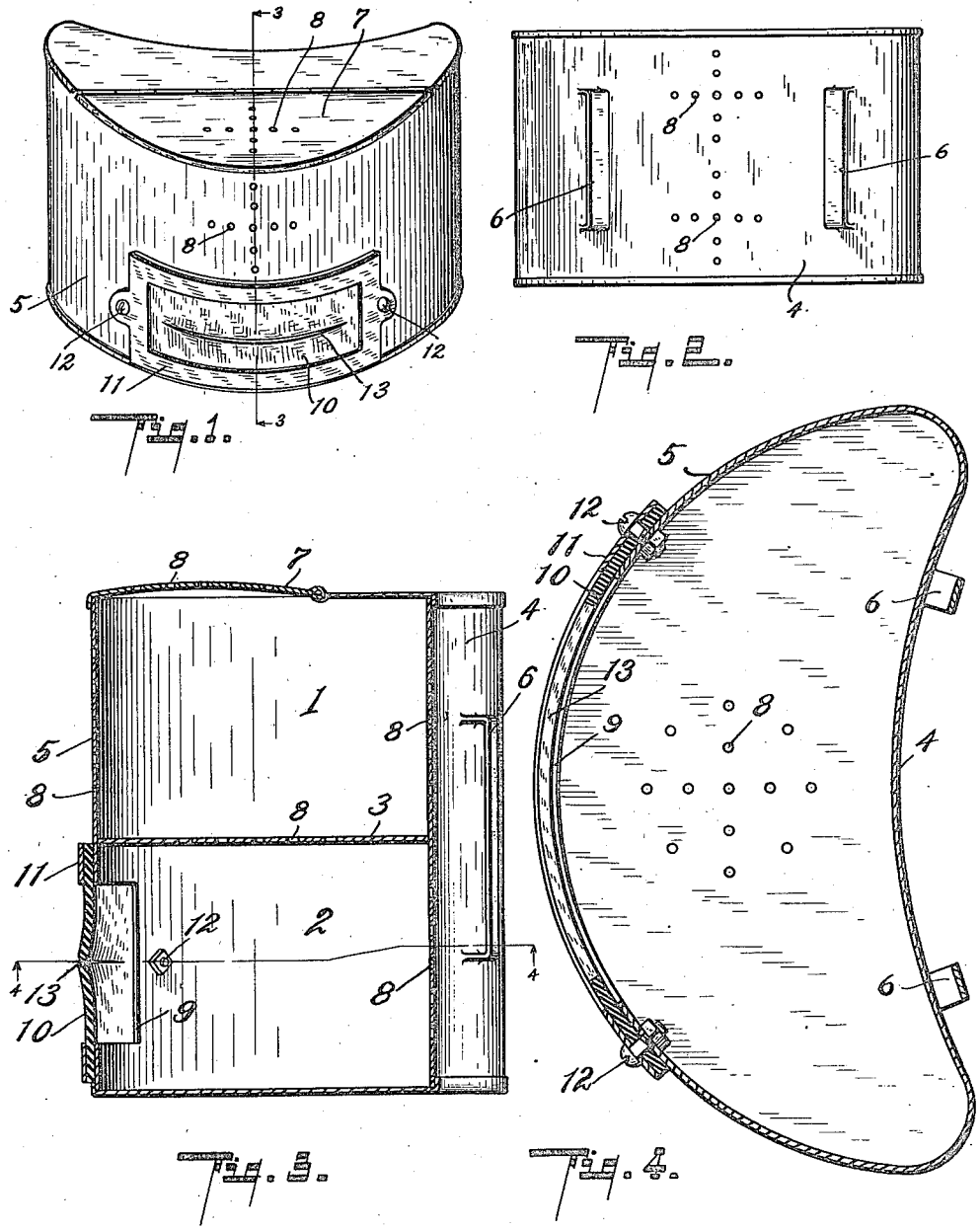

PERCY LAMB, OF ENGLEWOOD, COLORADO.

FISHING-BAIT BOX.

1,150,776.  Specification of Letters Patent.  Patented Aug. 17, 1915.

Application filed September 8, 1914. Serial No. 860,730.

*To all whom it may concern:*

Be it known that I, PERCY LAMB, a citizen of the United States, residing at Englewood, in the county of Arapahoe and State of Colorado, have invented certain new and useful Improvements in Fishing-Bait Boxes; and I do hereby declare the following to be a full, clear, and exact description of the invention, such as will enable others skilled in the art to which it appertains to make and use the same.

This invention relates to improvements in fishing bait boxes, and especially of that type adapted to be strapped on the waist of the fisherman, and commonly employed where streams are being whipped for trout, bass or similar game fish.

The main objections to bait boxes in general is that where grasshoppers and frogs particularly are being used as bait, they are constantly hopping away upon opening the bait box either to fill the same or in attempting to secure a bait for use. Besides this, where such bait is used in addition to angle worms, as is generally customary, two bait cans have to be employed, particularly as the worms are kept in dirt or loam and the other classes of bait are not.

A primary object of the invention, therefore, is to provide a bait receptacle with an effective means for controlling the admission and emission of such live bait to prevent their escape, either when filling the bait box or when being used; another object being to combine such a receptacle with at least another compartment for holding such semi-live bait as angle worms, or other bait, or for storing various small articles, when desired, such as tackle, artificial flies, etc.

A further principal object of the invention is to provide a bait box that is not only durable and simple in construction and operation, but which is effective in action and comparatively inexpensive to manufacture.

Figure 1 is a perspective view looking forwardly at my improved bait box. Fig. 2 is a rear elevational view of same. Fig. 3 is a vertical sectional view, taken along the plane of the line 3—3 of Fig. 1, and Fig. 4 is a horizontal sectional view, taken along the plane of the line 4—4 of Fig. 3.

1 designates an upper compartment and 2 a lower compartment, separated by a dividing partition 3, and having a common rear wall 4 and a front wall 5, the front wall being preferably of convex shape and the rear wall preferably of concave contour to fit the body of the wearer, the rear wall also having elongated eyelets 6 to receive a belt adapted to be passed around the waist of the wearer, but it is obvious that these eyelets may be horizontally disposed in alinement to adapt themselves for use with the suspenders of the wearer or a vertical strap attached to his fishing creel and supported from the shoulder.

The top of the upper compartment has a movable closure 7, preferably hinged, and the front wall of the lower compartment has a specific form of closure, hereinafter described and forming a special feature of my invention. As shown, the walls and top are provided with a series of groups of ventilating apertures designated by the numeral 8.

The front wall of the lower compartment has an elongated opening 9, shown as being horizontally disposed, and covering this opening is a flexible closure 10 secured to the box in any suitable way, shown in the drawings as comprising a curved rectangular frame 11 secured to the front wall of the compartment by any fastening means indicated by a pair of short bolts 12, passing through apertures in the retaining frame, closure and front wall, the closure and retaining frame overlapping the edges of the elongated opening 9. This closure 10 is slit as at 13 long enough to permit of the insertion of the fingers within the compartment, and as previously stated is preferably formed of rubber or a rubber composition to insure of its springiness or elasticity to close when the fingers are withdrawn.

Having thus described the invention what I claim is:—

As an article of manufacture, a bait box adapted to be suspended from the body of the user, comprising a receptacle formed as a unitary whole, having a flat bottom wall, a convex front wall, a concave rear wall, and an open top, elongated eyelets being disposed on said rear wall, said receptacle having a horizontal division plate separating the same into an upper and a lower compartment, and the front wall of said lower compartment having an elongated opening therein, a movable cover closing the open top of said upper compartment, an elastic closure for said elongated opening, and having a self-closing slit therethrough, located substantially below said division plate, a rectangular frame fitted over said elastic closure and surrounding said elongated opening, and means for securing said frame to the front wall of said lower compartment, with the edges of said elastic closure interposed between said wall and frame, and securely held in position thereby, substantially as described.

In testimony whereof, I affix my signature, in presence of two witnesses.

PERCY LAMB.

Witnesses:
EMMA GRANT,
J. G. GIUSTA.